UNITED STATES PATENT OFFICE.

OSKAR UNGER, OF LEVERKUSEN, NEAR COLOGNE, AND PAUL THOMASCHEWSKI, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

DYE.

994,803.  Specification of Letters Patent.  Patented June 13, 1911.

No Drawing.   Application filed October 21, 1910.   Serial No. 588,348.

*To all whom it may concern:*

Be it known that we, OSKAR UNGER and PAUL THOMASCHEWSKI, doctors of philosophy, chemists, citizens of the German Empire, residing, respectively, at Leverkusen, near Cologne, and Vohwinkel, near Elberfeld, Germany, have invented new and useful Improvements in New Dye, of which the following is a specification.

The present invention relates to the manufacture and production of new red wool dyestuffs which are obtained by treating arylaminoanthronpyridones containing an arylamino radical with an unsubstituted para position with sulfonating agents in such a way that more than one sulfonic group is introduced into the molecule.

The new dyes are, in the shape of their alkaline salts, dark red powders soluble in concentrated sulfuric acid generally with a reddish color which on addition of boric acid assumes an intense greenish yellow to orange fluorescence, soluble in water and in alcohol generally with a red color; dyeing wool red shades.

In order to illustrate the new process more fully the following examples are given, the parts being by weight:—

Example 1: 1 part of 4-phenylamino-1-anthra-n-methylpyridone (obtainable from 4-bromo-anthra-n-methylpyridone and anilin see United States Letters Patent 853041) is dissolved in 6 parts of fuming sulfuric acid (20 per cent. $SO_3$) and the resulting solution is heated to 30-40° C. for 1-2 hours. The mixture is then poured into 60 parts of water. The dye which is the disulfonic acid separates after a short time in the shape of vermilion red crystals which are filtered off, washed with a small quantity of water to remove the adhering acid and converted with the necessary quantity of caustic soda lye into the dark red sodium salt. The dye dissolves in concentrated sulfuric acid with a violet-red color which on addition of boric acid turns yellowish-red showing a strong orange fluorescence. The new coloring matter dyes wool from acid baths in bright scarlet shades, which are very fast and possesses probably the following formula:

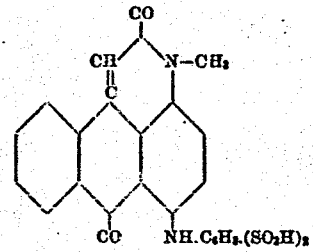

The product obtained from the pyridone from acetyl-1-amino-2.4-dibromoanthraquinone and anilin (see United States Letters Patent 853041) yields, on being sulfonated in the same way, a somewhat yellower dye.

Example 2: 1 part of 4-phenylamino-2-methyl-1-anthronpyridone (obtainable from 4-chloro-2-methyl-1-anthronpyridone and anilin (see British Letters Patent 19172/07) is heated with 10 parts of fuming sulfuric acid (20 per cent. $SO_3$) to 20-30° C. until a test portion is completely soluble in cold water. The mixture is then poured into a solution of common salt when the new dye is precipitated, and the dye is filtered off. It is soluble in concentrated sulfuric acid with a violet-red color which on addition of boric acid turns yellowish-red showing a very intense greenish-yellow fluorescence. It is soluble in water and alcohol with a red color and dyes wool a bright scarlet-red.

Example 3: 1 part of 4-meta-chlorophenylamino-1-anthra-n-methylpyridone (obtainable from bromoanthra-n-methyl-pyridone and meta-chloroanilin) is sulfonated with 10 parts of fuming sulfuric acid (10 per cent. $SO_3$) at a temperature of 20-30° C. The dye is then isolated as is described in Example 1. Its solution in concentrated sulfuric acid is bluish-red turning yellowish-red with orange fluorescence on addition of boric acid. It dyes wool in bright red shades. The process is carried out in the same way on sulfonating other of the above mentioned anthronpyridones e. g. 4-alpha-naphthylamino-1-anthra-n-methylpyridone, 4-phenylamino-1-anthra-n-phenylanthronpyridone, 4-meta-tolylamino-1-anthra-n-methylpyridone, etc.

We claim:—

1. The herein described new dyestuffs of the anthracene series, being di- and poly-sulfonic acids of arylaminoanthronpyridones, which dyes are in the shape of their alkaline salts dark red powders soluble in concentrated sulfuric acid generally with a reddish color which on addition of boric acid assumes an intense greenish yellow to orange fluorescence, soluble in water and in alcohol generally with a red color; dyeing wool red shades, substantially as described.

2. The herein described 4-phenylamino-1-anthra-n-methylpyridone disulfonic acid, which is after being dried and pulverized in the shape of its sodium salt a dark red powder soluble in concentrated sulfuric acid with a violet-red color which on addition of boric acid turns yellowish-red showing a strong orange fluorescence; dyeing wool from acid baths bright scarlet shades, substantially as described.

In testimony whereof we have hereunto set our hands in the presence of two subscribing witnesses.

OSKAR UNGER. [L. S.]
PAUL THOMASCHEWSKI. [L. S.]

Witnesses:
CHAS. J. WRIGHT,
WALTER VONNEGUT.

---

Copies of this patent may be obtained for five cents each, by addressing the "Commissioner of Patents, Washington, D. C."